Patented Mar. 18, 1947

2,417,792

UNITED STATES PATENT OFFICE 2,417,792

ADHESIVE COMPOSITIONS AND PROCESS

John J. Verbanc, Tuxedo Park, Del., assignor to E. I. du Pont de Nemours & Company, Wilmington, Del., a corporation of Delaware No Drawing. Application August 19, 1943, Serial No. 499,229

7 Claims. (Cl. 260—768)

This invention relates to an improved composition of matter and a method of making the same. More particularly, the invention pertains to an improved adhesive composition which is adapted for use in bonding natural and synthetic textile fibers and especially rayon to various elastomeric materials.

The fact that viscose rayon is not "wet" by rubber and rubber-like materials, and consequently, when composite articles, for example tire carcasses, are made from viscose rayon and rubber or a rubber substitute, only a very slight adhesive bond exists between the fabric and the rubber, has long been recognized as a major detriment to the commercial use of this valuable synthetic fiber. A large number of methods have previously been proposed to develop adhesion between rayon and rubber, one of the most successful of which consisted in the use of a latex-resorcinol-formaldehyde treatment. However, this type of adhesive has many inherent deficiencies. For example, it discolors and decreases the flexibility of fabric. The coating is rigid and brittle and therefore is easily damaged by handling. The composition consisting of latex and a resorcinol formaldehyde resin must be used immediately, since on standing it gels to an unusable condition. In addition, this method involves the use of an aqueous solution which is very harmful to the rayon fabric and requires long periods of drying at elevated temperatures, which in turn, decreases the possible output of treated fabric from equipment of definite size.

An object of this invention, therefore, is to provide an improved adhesive composition which tenaciously adheres textile fibers, and especially fibers of viscose rayon, to vulcanized rubber and rubber-like substances. A further object is to provide an adhesive composition which when placed on a textile fabric will not excessively discolor or stiffen the fabric. In addition, it is an object of this invention to provide an adhesive composition which will bond textiles to rubber and its substitutes at normal and at elevated temperatures, e. g., from 25°–125° C. It is also an object of this invention to produce an adhesive composition which will produce adhesive bonds between textile fibers and vulcanized rubber or rubber-like substances which will remain effective at elevated temperatures in the presence of water. A further object is to provide an adhesive from rubber and a polyfunctional isocyanate compound which will remain stable and usable as an adhesive for a period of several months. These and further objects will appear hereinafter.

These objects are accomplished by the present invention which, briefly stated, comprises treating isoprene polymers dissolved in a solvent with an organic polyisocyanate compound and heating the resulting cement. The heating is carried out until a large drop (e. g., as high as a 20–30% decrease or more) in the viscosity of the cement is noted.

This reaction can be hastened by premasticating the isoprene polymer in the presence or absence of rubber peptizing agents, e. g., aromatic mercaptans. The reaction may also be hastened by the addition of rubber peptizing agents directly to the cement prior to heating.

By the term "isoprene polymer" I mean to include both natural rubber, e. g., smoked sheets, pale crepe, gutta percha and balata, and also synthetic elastomers prepared by polymerizing isoprene.

Throughout the description of this invention the term "plasticity" is employed to quantitatively describe the state of the isoprene polymer, e. g., rubber, being used. The numerical index in the term refers to the thickness in thousandths of an inch obtained when a pellet 2 cc. in volume is compressed isothermally at 80° C. between platens of a press loaded with a weight of 5000 grams for a period of three minutes. The term used is an inverse measurement of softness; i. e., 90-plasticity rubber is not as soft as 60-plasticity rubber.

The term "elastomeric material" as used herein is intended to cover natural rubber, for example, smoked sheets, pale crepe, gutta percha and balata, and also various synthetic rubber-like materials produced from such materials as isoprene, butadiene, chloroprene, etc., alone and with other polymerizable materials. As examples of these may be cited the neoprenes, Hycar, Chemigum, GR-S, Buna S, Buna N, Perbunan, and rubber.

The following examples further illustrate the principles of my invention and divers embodiments including the best mode contemplated for carrying out the same. Parts are given by weight throughout the specification unless otherwise indicated.

EXAMPLE I 50 parts of blended smoked sheet rubber and 450 parts of dry xylene were charged into a stainless steel kettle. 0.25 part of thio-alpha-naphthol was added with stirring and the contents of the kettle heated at 135° C. for a period of 48 hours. 10 parts of methylene-bis-(4-phenyl-isocyanate) was added and the cement heated for an additional 24 hours. The reaction mixture was cooled and discharged from the kettle. 492 parts of a smooth cement was obtained (96% of the theoretical yield). The product obtained had a specific gravity of 0.86 at 25° C. and a Stormer viscosity of 7.5 seconds at 25° C. This material when tested for bonding power as outlined in co-pending Neal and Verbanc application, Serial No. 436,536 filed March 27, 1942, was shown to be an efficient bonding agent for adhering rayon, cotton, nylon and the like to rubber and other elastomeric materials. Data listed in Table I shows the efficiency of this adhesive immediately after manufacture and after storage for from 4 to 29 weeks.

TABLE I

*Bonding viscose rayon to an elastomer composition*

| Vulcanizable elastomer carcass stock | Deposition of cement per cent weight on fabric | Stormer viscosity in seconds at 25° C. after aging cement | | | | |
|---|---|---|---|---|---|---|
| | | 1 day [1]7.5 | 4 weeks [1]7.5 | 12 weeks [1]7.6 | 16 weeks [1]7.7 | 20 weeks [1]7.7 |
| Rubber | | 3.0 | | | | |
| Do | 5.0 | 20 | 20 | 21 | 20 | 21 |
| Do | 10.0 | 30 | 31 | 35 | 31 | 32 |
| Buna S | | 3.0 | | | | |
| Do | 5.0 | 20 | 21 | 22 | 20 | 21 |
| Do | 10.0 | 30 | 32 | 33 | 32 | 33 |

[1] Pounds pull per linear inch at 25° C.

The data listed shows that poor adhesion exists between untreated regenerated cellulose and a rubber or Buna S (butadiene-styrene copolymer) carcass stock. Treatment with the adhesive cement of this invention, however, improves the bond tremendously. The stability of the cement does not change appreciably over a 20 week period as indicated by the viscosity and bonding efficiency.

This cement has also been found to be satisfactory for treating tire cord fabric manufactured from regenerated cellulose. Tires built from such cord have proved to be superior to tires made using either cotton cords or regenerated cellulose cords treated by the conventional resorcinol-formaldehyde/latex cement.

EXAMPLE II 50 parts of 70-plasticity rubber and 450 parts of toluene were placed in a reaction vessel equipped with a stirrer, reflux condenser, and a thermometer. After agitating at 25°–30° C. for several hours, the rubber completely dissolved forming a smooth cement. Hexamethylene diisocyanate (50 parts) was added and the whole mass heated at 75° C. for 280 hours. During the heating cycle a decrease in viscosity was noted and simultaneously an increase in effectiveness of the resulting cement as a bonding agent. These statements are substantiated by the data given in Table II.

TABLE II

*Rubber cement containing hexamethylene diisocyanate, heated at 75° C.*

| Exp. No. | Hours heating at 75° C. | Viscosity in seconds at 25° C.[1] | Bonding regenerated cellulose to a rubber carcass stock, pounds pull at 25° C. 10% deposition on fabric |
|---|---|---|---|
| 1 | 16 | 624.0 | 14 |
| 2 | 40 | 352.0 | 22 |
| 3 | 64 | 182.0 | 29 |
| 4 | 88 | 95.0 | 38 |
| 5 | 160 | 17.0 | 35 |
| 6 | 184 | 15.0 | 30 |
| 7 | 208 | 14.5 | 30 |
| 8 | 232 | 14.2 | 29 |
| 9 | 256 | 14.2 | 31 |
| 10 | 280 | 14.2 | 28 |

[1] Toluene blank = 12.2 seconds.

From the data listed in Table II it is apparent that a large decrease in viscosity occurs on heating the cement at 75° C. It is also apparent that the efficiency of this cement as an adhesive increases as the heating cycle progresses. Although further heating (above 160 hours) decreases the effectiveness of this cement as an adhesive slightly, the fact that this cement can be heated at elevated temperatures for such a long period of time and still remain effective further demonstrates the stability of cements prepared by this invention and the wide limits of the process.

EXAMPLE III 900 parts of dry carbon tetrachloride, 100 parts of unmilled smoked sheet rubber and 1.25 parts of thio-alpha-naphthol were placed in a reaction vessel equipped with an agitator, reflux condenser, and a thermometer. The contents were heated at 75° C. for 24 hours. During this period the rubber dissolved forming a smooth cement. 20 parts of methylene-bis-(4-phenyl-isocyanate) was added and the reaction mass heated at 75° C. for an additional 8 hours. The charge was cooled to 25° C. and removed. This cement was tested as an adhesive for bonding regenerated cellulose to vulcanizable elastomer carcass stocks. The results obtained are shown in Table III.

TABLE III

*Bonding regenerated cellulose to various elastomers*

| Bonded to carcass stock | Deposition of cement (per cent weight of fabric) | Pounds pull per linear inch at 25° C. |
|---|---|---|
| Rubber | 20 | 34 |
| Neoprene [1] | 20 | 34 |
| Buna S | 20 | 37 |

[1] Neoprene made according to U. S. P. 2,264,173, Example 25.

EXAMPLE IV 100 parts of unmilled pale crepe rubber, 900 parts of dry xylene and 12.5 parts of hexamethylene diisocyanate were placed in a reaction vessel equipped with agitation, a reflux condenser, and a thermometer. The contents of the reaction vessel were heated at 135° C. for a period of 35 hours. During this time a smooth cement was formed, which had a Stormer viscosity at 25° C. of 7.3 seconds. This adhesive was tested as a bonding agent for adhering regenerated cellulose to a vulcanizable carcass stock. The test results are shown in Table IV.

TABLE IV

*Bonding regenerated cellulose to a vulcanizable rubber carcass stock*

| Exp. No. | Deposition of cement (per cent weight of fabric) | Pounds pull per linear inch at 25° C. |
|---|---|---|
| 1 | 5 | 23 |
| 2 | 10 | 26 |
| 3 | 15 | 30 |
| 4 | 20 | 35 |
| 5 | Blank | 3.0 |

EXAMPLE V 100 parts of unmilled smoked sheet rubber, 900 parts of dry xylene, 0.1 part of thio-alpha-naphthol were placed in a reaction vessel equipped with a reflux condenser, an agitator and a thermometer. The mixture was heated at 135° C.

for a period of 72 hours, during which time the rubber dissolved to form a low viscosity cement, 20 parts of methylene-bis-(4-phenyl-isocyanate) was added and the heating continued for 24 hours. The cement was cooled and discharged. Data obtained in bonding regenerated cellulose to rubber, Buna S and neoprene* are shown in Table V.

TABLE V

*Bonding regenerated cellulose to elastomer carcass stocks*

| Exp. No. | Deposition of cement (per cent weight of fabric) | Elastomer carcass stock | Pounds pull per linear inch at 25° C. |
|---|---|---|---|
| 1 | 10 | Rubber | 29 |
| 2 | 10 | Neoprene¹ | 25 |
| 3 | 10 | Buna S | 35 |
| 4 | Blank | Rubber | 3.0 |
| 5 | Blank | Neoprene¹ | 2.5 |
| 6 | Blank | Buna S | 3.0 |

¹ Neoprene made according to U. S. P. 2,264,173, Example 25. This cement was also effective in bonding cotton and nylon to rubber carcass stock.

EXAMPLE VI 100 parts of crude smoked sheet rubber, 900 parts H-51 solvent (petroleum fraction B. P.=105°-150° C. approximately) and 1 part of thio-alpha-naphthol were placed in a reaction vessel equipped with an agitator, a reflux condenser and a thermometer. The contents were heated at 100° C. for a period of 16 hours. 20 parts of methylene-bis-(4-phenyl-isocyanate) was added and the heating cycle continued for 8 hours. The cement thus obtained was light colored and smooth, and had a Stormer viscosity of 10.3 seconds at 25° C. Test data obtained in bonding regenerated cellulose to various elastomeric materials both at 25° C. in air and at 70° C. in the presence of water is listed in Table VI.

TABLE VI

*Bonding regenerated cellulose to vulcanizable elastomer stocks*

| Exp. No. | Deposition of cement (per cent weight of fabric) | Elastomer stock bonded to— | Pounds pull per linear inch | |
|---|---|---|---|---|
| | | | 25° C. (air) | 70° C. (H₂O) |
| 1 | 5.0 | Rubber | 15.0 | 10.0 |
| 2 | 10.0 | ...do | 30.0 | 23.0 |
| 3 | 5.0 | Neoprene¹ | 12.0 | 6.0 |
| 4 | 10.0 | ...do | 24.0 | 14.0 |
| 5 | 5.0 | Buna S | 15.0 | 11.0 |
| 6 | 10.0 | ...do | 27.0 | 23.0 |

¹ Neoprene made according to U. S. P. 2,264,173, Example 25.

EXAMPLE VII 200 parts of 90-plasticity pale crepe rubber, 1800 parts of dry toluene and 200 parts of hexamethylene diisocyanate were placed in a reaction vessel and heated at 75° C. for 24 hours. During the heating period the rubber swelled and finally dissolved, forming a smooth cement. The resulting batch was cooled and discharged. Subsequent testing of this cement as an adhesive as previously outlined (see Neal and Verbanc application Serial No. 436,536) shows it to be an excellent bonding agent for increasing the adhesion between cotton and rubber. Data obtained is given in Table VII.

*Neoprene made according to U. S. P. 2,264,173, Example 25.

TABLE VII

*Bonding 30 oz. cotton belting fabric to rubber carcass stock*

| Exp. No. | Deposition of cement (per cent weight of fabric) | Pounds pull per linear inch at 25° C (air) |
|---|---|---|
| 1 | 10.0 | 35 |
| 2 | 15.0 | 40 |
| 3 | 20.0 | 47 |
| 4 | 25.0 | 60 |
| 5 | Blank | 19 |

The outstanding strength of the adhesive bond obtained between 30 oz. cotton belting fabric and a rubber carcass stock by this method is shown by the following test.

Square woven 30 oz. cotton duck was painted with three coats of the rubber cement of Example VII, drying the treated fabric at 60° C. before each application. After final drying the treated fabric was frictioned on both sides on a calender using the following rubber stock.

| Rubber friction stock | Parts |
|---|---|
| Rubber (rolled brown) | 80.00 |
| "RPA" No. 2 (¹) | 0.20 |
| Zinc oxide | 5.00 |
| Stearic acid | 1.50 |
| "Neozone" D¹ | 0.75 |
| Pine tar | 7.50 |
| Thermax² | 10.00 |
| Channel black² | 27.00 |
| Reclaimed rubber | 35.00 |
| Cumar RH² | 5.00 |
| Mineral rubber² | 12.00 |
| "Zenite" B¹ | 0.75 |
| Sulfur | 4.00 |

¹ For constitution see Du Pont Rubber Chemicals—Report No. 43-1, February, 1943.
² For constitution see Compounding Ingredients for Rubber—Bill Bros. Publishing Corp., 1936.

Belting was then plied up using alternating layers of frictioned fabric (8″ x 8″) and rubber carcass stock having a gauge thickness of 0.010″.

| Rubber carcass stock | Parts |
|---|---|
| Rubber | 100.00 |
| Zinc oxide | 5.00 |
| Stearic acid | 2.00 |
| "Neozone" D | 1.50 |
| Pine tar | 2.80 |
| 2-mercaptobenzothiazole | 0.75 |
| Sulfur | 2.75 |

The final composite article consisted of four plies of frictioned fabric and three plies of rubber carcass stock. The slab was then inserted in a mold (8″ x 8″ x ⅜″) built up to mold level by additional layers of tin foil and cured 30 minutes at 40# steam pressure. The cured slab was allowed to cool to 28° C. and cut into 1″ x 7″ test strips.

The test strips were mounted on a U. S. type flexing machine and flexed under a load of 100# employing a speed of 150 cycles/minute and a hub having a 1.25″ O. D. The specimen was considered to have failed when there was a clear separation across the width of the specimen. Flexing data are given in Table VIII.

TABLE VIII

*Flexing of belting samples*

| Exp. No. | Blank flexing hours | Cement treated fabric flexing hours |
|---|---|---|
| 1 | 30.25 | 90.5+ |
| 2 | 27.00 | 90.5+ |
| 3 | 29.75 | 87.5+ |
| 4 | 23.50 | 87.5+ |

The belting manufactured from untreated fabric was flexed to failure. However, the belting made from the cement treated fabric was removed at the times noted, the test strips showing no signs of failure.

EXAMPLE VIII 1000 parts of xylene, 100 parts of unmilled smoked sheet rubber and 2.5 parts of thio-alpha-naphthol were placed in a reaction vessel equipped with agitation, distilling column and a thermometer. The reaction mass was heated to 141°–42° C. and 100 parts of xylene distilled. The distilling column was changed to reflux and 20 parts of methylene-bis-(4-phenyl-isocyanate) was added. The solution was heated 8 hours at 135° C. and the resulting product cooled to 30° C. and discharged. The adhesive was tested as a bonding agent for adhering square woven regenerated cellulose fabric to rubber and Buna S carcass stocks. Deposition of 5% of this cement on the fabric gave a bond with either elastomer which required a pull of 25 lbs. per linear inch for rupture.

EXAMPLE IX 1000 parts of xylene and 100 parts of commercial grade gutta percha were placed in a glass reaction vessel and heated at 141°–42° C. in order to distill off 100 parts of solvent, thus removing all traces of water from the resulting cement. 20 parts of methylene-bis-(4-phenyl-isocyanate) was added and the mixture heated at 135° C. for a period of 8 hours. The resulting dark colored cement was smooth and had a low viscosity. This cement was tested as an adhesive for bonding viscose rayon to rubber and Buna S. The results are shown in Table IX.

TABLE IX

*Bonding viscose rayon to vulcanizable elastomers*

| Exp. No. | Elastomer stock | Deposition of cement (per cent weight of fabric) | Pounds pull per linear inch 25° C. (air) | Pounds pull per linear inch 70° C. (H₂O) |
|---|---|---|---|---|
| 1 | Rubber | 10.0 | 27.0 | 15.0 |
| 2 | do | 20.0 | 35.0 | 30.0 |
| 3 | Buna S | 10.0 | 33.0 | 17.0 |
| 4 | do | 20.0 | 45.0 | 42.0 |

EXAMPLE X 500 parts of xylene, 35 parts of poly-isoprene (prepared by emulsion polymerization of isoprene in an alkaline system) and 0.5 part of thio-alpha-naphthol were placed in a reaction vessel and heated at 141°–42° C. with agitation until 180 parts of xylene was distilled off. This served to remove water from the remaining cement. Seven parts of methylene-bis-(4-phenyl-isocyanate) was added and the cement heated at 135° C. for a period of 8 hours. 356 parts of a smooth cement resulted having a Stormer viscosity of 8.1 seconds. When used as an adhesive for bonding rayon to a rubber carcass stock, a 10.9% coating of this adhesive on the fiber gave a bond strength of 26–28 lbs./linear inch.

It is to be understood, of course, that the above examples are merely illustrative and that the invention comprehends a wide variation in reagents and conditions from those above specified. Thus, although most of the examples utilize a 10% cement, I have found that the concentration is not critical but may be varied from 1–50% depending upon the plasticity of the rubber used, the solvent employed and the heating time and the deposition required. The preferred range is from 5–20%.

The amount of the poly-isocyanates in the cement composition may range from 0.5 to 95% by weight, based on the weight of the elastomer, the preferred concentration range being 5 to 25%.

As examples of organic poly-isocyanates the following may be named: hexamethylene diisocyanate, para-phenylene diisocyanate, 2,3-dimethyl-tetramethylene diisocyanate, decamethylene diisocyanate, para,para'-diphenylene diisocyanate, 2-chloro-trimethylene diisocyanate, 5-nitro-1,3-phenylene diisocyanate, ethylene diisocyanate, dodecamethylene diisocyanate, meta-phenylene diisocyanate; polymethylene diisocyanates such as trimethylene diisocyanate, tetramethylene diisocyanate, pentamethylene diisocyanate, etc.; alkylene diisocyanates such as propylene-1,2-diisocyanate, butylene-1,2-diisocyanate, butylene-2,3-diisocyanate; cyclo-alkylene diisocyanates such as cyclo-hexylene-1,2-diisocyanate; aromatic diisocyanates, 1-methyl-phenylene-2,4-diisocyanate, naphthylene-1,4-diisocyanate; aliphatic aromatic diisocyanates such as xylene diisocyanate, methylene-bis-(4-phenyl-isocyanate), and diisocyanates containing hetero atoms such as $$OCN-CH_2-O-CH_2NCO$$

$$OCNCH_2CH_2-O-CH_2CH_2NCO$$

and $$OCN(CH_2)_3-S-(CH_2)_3NCO$$

In fact, any poly-isocyanate of the general formula R(NCO)ₙ in which R is a polyvalent organic radical and $n$ is an integer larger than 1, will function for the above said purposes of the present invention.

Although xylene has been specified in most of the above examples as the solvent for the rubber and the cyanate compound, it is to be understood that this invention is not limited thereto and that any liquid which is non-reactive with the cyanate compound, and which is a solvent for both the rubber and the cyanate compound will be suitable, e. g., benzene, gasoline, carbon tetrachloride, ethylene dichloride, chlorobenzene, kerosene, etc., or mixtures thereof.

The temperature at which these cements are heated does not appear to be critical, but can vary between wide limits. In most instances the temperature at which the cement is heated is dependent upon the boiling point of the solvent. However, it is possible to employ a closed vessel which will withstand internal pressure in order to heat a cement above the boiling point of the particular solvent employed. A temperature range of 75°–250° C. is generally satisfactory while the preferred range is 75°–150° C.

The time of heating can also vary between wide limits. It is directly dependent upon the following factors:

(1) Plasticity of rubber.
(2) Amount of peptizing agent.
(3) Concentration of cement.
(4) Type of solvent employed and its boiling point.

In general, however, the heating period should continue until a large decrease in viscosity of the cement is noted (see Table II). The preferred range, however, is from 1–72 hours.

The amount of peptizing agent may also be used over a large range in concentration. I have found, however, that from 1 to 5% based on the rubber is sufficient. As peptizing agents any of the known peptizing agents for rubber may be used.

The quantity of the adhesive composition of this invention applied to the yarn, cord or fabric to be adhered to the elastomeric material will vary, depending upon the article to be manufactured and the strength of the bond desired; satisfactory results are obtained when the increased weight of the treated yarn, cord or fabric, which measures the quantity of cement applied, is from 0.25% to 95%. In general, amounts of 5% to 20% give very satisfactory results and constitute the preferred range.

The yarns, cords or fabrics may be treated with this adhesive combination by any suitable means such as by immersing in a dipping tank, regulating the amount of material adhering to the fabric by means of squeeze rolls, scrapers, or other suitable devices, or by merely allowing the excess to drain off followed by solvent evaporation either spontaneously or at elevated temperatures.

The cord, fabric or other structure bonded by means of this adhesive may be composed of natural cellulosic fibers such as cotton, or of regenerated cellulose produced by the viscose process or regenerated cellulose produced by the cupramonium process, or cellulose esters and ethers. The cord or other structures may be composed of a plurality of filaments or it may be composed of a monofil.

Cords and fabric made from materials other than cellulosic materials, such as wool and nylon, may also be bonded to vulcanizable elastomeric materials by use of this adhesive. This adhesive is also useful for bonding elastomers to wood, leather, metals and the like.

Several of the more important advantages of my invention are illustrated by the following tests: If square woven viscose sailcloth, treated with the cement of this invention, is placed upon a commercial compounded rubber stock, such as is customarily used in the manufacture of tires, and the whole vulcanized, the treated rayon is found to be strongly bonded to the rubber. If the treated rayon fabric is subjected to a standard pull-off test at an elevated temperature, for example, 212°–250° F., to measure the bond between the fabric and elastomer at this temperature, the bond is found to be superior to that of a cotton fabric to rubber at this temperature, a fact which is of the utmost importance in the construction of tires, fan belts and similar articles, which develop a high temperature under normal conditions of usage. Many of the previously known adhesives fail to provide a satisfactory bond at temperatures in this range.

In direct contrast to adhesive compositions not containing polyisocyanates, the present invention increases the durability of flexing and bending of a pad consisting of plies of fabric treated as outlined above to which a skim coat of compounded rubber stock has been applied and the resulting pad vulcanized. For example, while a pad prepared from untreated regenerated cellulose fabric may be flexed 2,250 times and a similar one from untreated cotton may be flexed 27,000 times before separation of the plies takes place, a pad prepared from regenerated cellulose fabric treated with the adhesive of this invention may be flexed about 144,000 times before separation of the plies takes place.

In addition to the foregoing advantages, the treatment of regenerated cellulose cord or fabric with cements of the present invention does not excessively discolor, stiffen or harden the cord or fabric. The cords or fabrics treated with this cement are relatively non-tacky and exhibit no peeling or cracking as is often the case with adhesives known to the art at the present time. The process of treating cellulosic materials as outlined in the examples, contrary to the processes of the prior art, is performed in the absence of water. Water is known to be deleterious to regenerated cellulose cord and fabric, since it causes a pronounced swelling and weakening of this material. This adhesive also possesses several additional advantages. These are: (1) ease of application, (2) simplicity of equipment, making unnecessary any pronounced changes in the equipment in current commercial processes for the treatment of fabrics or individual cords, and (3) the cheapness and availability of these raw materials. First and foremost, however, this invention makes possible the production of adhesive compositions containing rubber and a polyfunctional isocyanate compound which can be stored for long periods of time without loss in either coating or bonding efficiency.

Since it is obvious that various changes and modifications may be made in the above description without departing from the nature or spirit thereof, this invention is not restricted thereto except as set forth in the appended claims.

I claim:

1. An adhesive composition suitable for bonding textile reinforcing structures to elastomeric stock which comprises the reaction product of an organic diisocyanate and an elastic isoprene polymer dissolved in an organic solvent for said reaction product.

2. An adhesive composition suitable for bonding textile reinforcing structures to elastomeric stock which comprises the reaction product of an organic diisocyanate and rubber dissolved in an organic solvent for said reaction product.

3. The reaction product of an organic diisocyanate and an elastic isoprene polymer.

4. The reaction product of an organic diisocyanate and rubber.

5. An organic textile material coated with the reaction product of an organic diisocyanate and an elastic isoprene polymer.

6. The process which comprises reacting a mixture comprising an organic diisocyanate and an elastic isoprene polymer dissolved in an inert organic solvent at a temperature of from 75° to 150° C. for a period of from 1 to 72 hours.

7. The process which comprises reacting an organic diisocyanate and rubber dissolved in an inert organic solvent at a temperature of from 75° to 150° C. for a period of from 1 to 72 hours.

JOHN J. VERBANC.

REFERENCES CITED

The following references are of record in the file of this patent:

UNITED STATES PATENTS

| Number | Name | Date |
|---|---|---|
| 2,277,083 | Dorough | Mar. 24, 1942 |
| 2,313,945 | Kellog | Mar. 16, 1943 |
| 2,356,005 | Roguemore | Aug. 15, 1944 |